United States Patent [19]

Grace

[11] 3,719,295
[45] March 6, 1973

[54] CONTROLLED MECHANICAL STORAGE DEVICE

[75] Inventor: Robert W. Grace, Sandusky, Ohio
[73] Assignee: Jervis B. Webb Company
[22] Filed: Oct. 6, 1970
[21] Appl. No.: 78,363

[52] U.S. Cl. ..................214/674, 187/95, 187/19, 214/16.4 A
[51] Int. Cl. ...............................B66f 7/22
[58] Field of Search...214/16.4 A, 16.1 EB, 16.1 CE, 214/670, 671, 674, 672; 187/26, 8.59, 17, 95, 19

[56] References Cited

UNITED STATES PATENTS

| | | | |
|---|---|---|---|
| 2,663,435 | 12/1958 | Eliot | 214/16.1 EB |
| 2,785,809 | 3/1957 | Riblet | 214/16.1 EB |
| 3,018,903 | 1/1962 | Bianca | 214/16.1 EB |
| 3,323,661 | 6/1967 | Chasar | 214/16.4 A |

FOREIGN PATENTS OR APPLICATIONS 751,212    1/1967    Canada............................214/16.4 A Primary Examiner—Drayton E. Hoffman
Assistant Examiner—Jerold M. Forsberg
Attorney—Farley, Forster and Farley

[57] ABSTRACT

A mechanical storage device for loading and unloading storage racks consisting of lower and upper trucks which travel along vertically spaced rails, and a mast connected between the trucks. A carriage with a laterally shiftable load table is vertically movable in a path defined by guides on the mast, and the horizontal attitude of the carriage is independently controlled by chains cross-connected between the trucks and trained about pairs of sprockets on the carriage. Vertical movement of the carriage is obtained by a hoist unit mounted on the carriage and driving one or more of the sprockets so that the carriage moves along the chains. The vertical attitude of the mast is adjustable to align the device with storage rack structure.

10 Claims, 5 Drawing Figures

INVENTOR
Robert W. Grace
BY
Farley Forster & Farley
ATTORNEYS

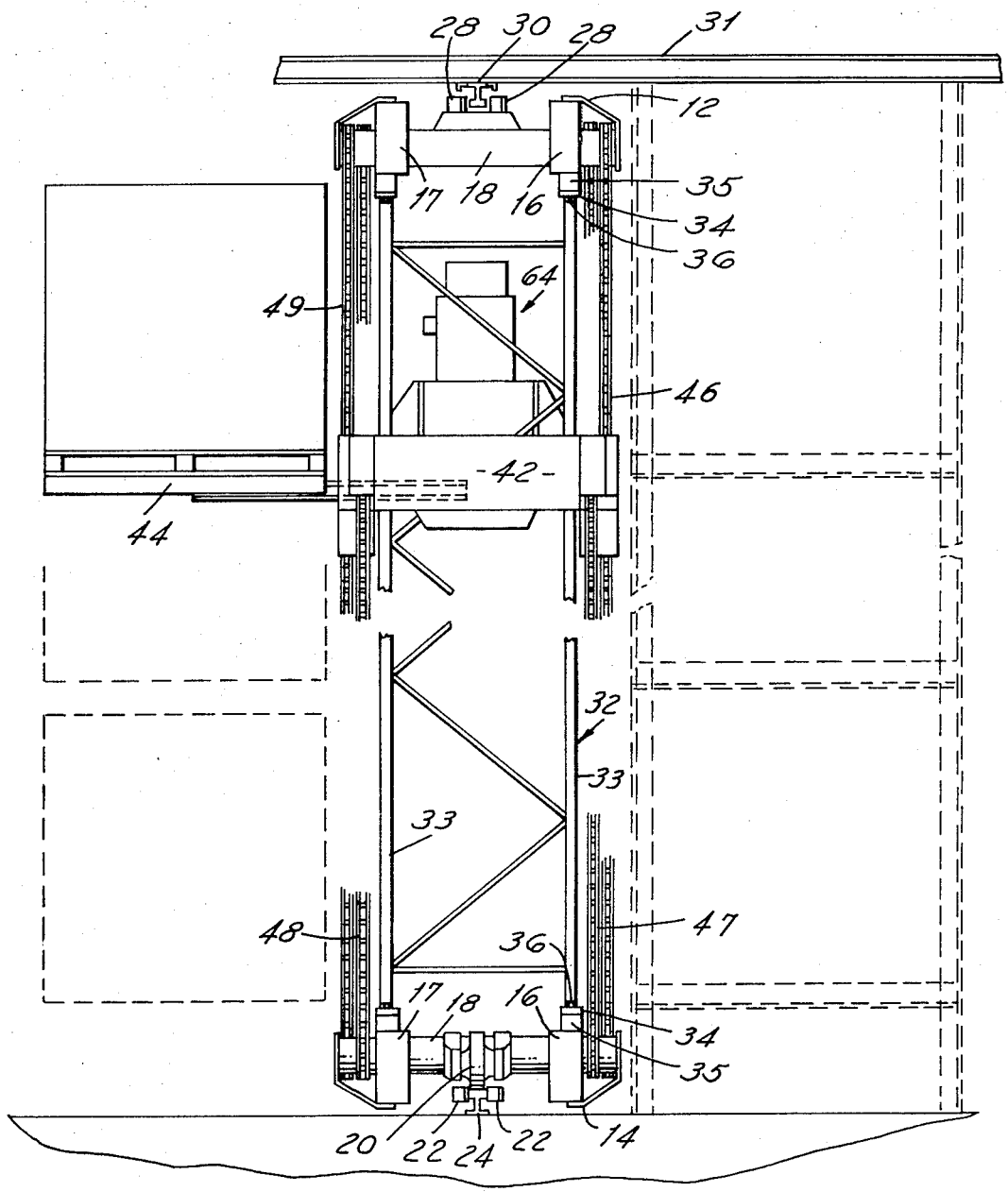

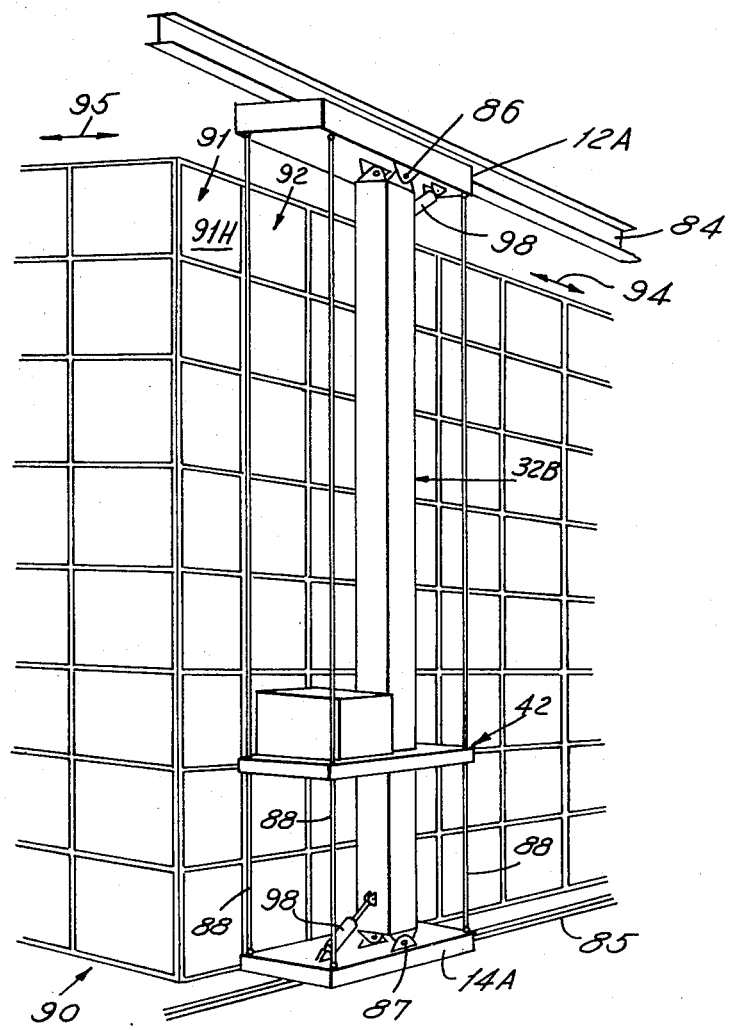

CONTROLLED MECHANICAL STORAGE DEVICE

SUMMARY OF THE INVENTION

This invention relates to improvements in the construction of a mechanical storage device used for the handling of articles to and from storage spaces provided by rack structure in a warehouse or other article handling and storage facility.

Various constructions have been proposed for both automatic and manually controlled mechanical storage devices. These constructions commonly include vertically extending mast structure, a carriage vertically movable along guides provided on the mast structure, the carriage having a laterally extendable and retractable load table, and a base to which the mast structure is rigidly secured. The base of some devices is adapted to be supported by and travel along overhead rails; in other devices, the base is supported on the floor; and in still others the base is of split construction, having upper and lower trucks or frames engaging vertically spaced rails. A hoist for moving the carriage vertically is usually mounted on the base, and the position and attitude of the carriage is established by the hoist connection and the guides.

Article handling and storage facilities employing mechanical storage devices make increasing use of the vertical storage space available, and as the height of the storage rack structure is increased and the mast structure of the device is correspondingly lengthened, various problems are encountered. Aside from the cost factors that may be expected as a result of the increasing dimensions mentioned above, the problem of aligning the mast and rack structure becomes increasingly critical when the article handling and storage facility is first installed, and may continue to be critical during the operation of the facility unless adequate provision is made for changes in the position of the rack structure.

A conventional storage rack structure is not dimensionally stable, but is subject to shifting or changing in position of the upper portion of the structure relative to the lower portion thereof caused by temperature variations, unequal load distribution or a combination of both. The degree of instability tends to increase with the height of the rack structure, which is conventionally arranged to provide vertical rows of storage spaces, and a shift of three inches or more in the position of an upper space relative to a lower space in one of these rows is a common occurrence. This shift in position can take place relative to vertical planes which extend parallel and perpendicular to the path of movement of a storage device along an aisle bordered by the rack structure.

The usual solution to these alignment problems has been to provide additional clearance between the storage device and the rack structure and additional horizontal space in each vertical row of storage spaces. Obviously, this solution results in wasted space; also, it is not entirely satisfactory for an article handling and storage facility employing a storage device controlled to automatically deposit or retrieve an article from a selected storage space.

The principle objects of the present invention are to provide an improved construction of a mechanical storage device incorporating features which permit compensation for alignment problems; which simplify the construction of the device and thereby reduce its cost; and, which permit greater flexibility in the design of the article handling carriage.

A mechanical storage device constructed in accordance with the invention has a base movable along a substantially horizontal support, mast structure, connecting means for attaching the mast structure to the base with the mast structure extending generally vertically, an article handling carriage, guide means on the carriage and the mast structure for defining a path of movement of the carriage, means connected to the base and to the carriage for establishing a desired horizontal attitude of the carriage independently of the vertical attitude of the mast structure, and a hoist for raising and lowering the carriage in the path of movement defined by the mast structure.

The base of the device may be any of the conventional forms previously mentioned; preferably however the base comprises an upper frame and a lower frame at least one of which includes means capable of supporting and guiding the device for travel. The mast structure, which may be a simple box truss, can be adjustably connected to the base frames to obtain a degree of vertical tilt of the mast structure and path of carriage movement defined thereby.

Independent control of the horizontal attitude of the carriage is obtained by a plurality of flexible members, preferably chains, each chain being secured to the upper and lower frames and having a portion extending generally horizontally across the carriage and engaging horizontally spaced sprockets rotatably mounted thereon, there being at least two horizontally spaced series of sprockets, each series being mounted on a common shaft. This construction has an added advantage over other possible constructions for independently controlling the attitude of the carriage in that it permits the hoist to be mounted on the carriage and arranged to drive one of the shafts so that the carriage moves along the chains.

In installations where frequent shifting of the rack structure is expected, the adjustable connection between the mast structure and the base of the storage device includes a pivot and a variable length connecting member secured to the base and to the mast structure for tilting the latter.

Other features and advantages of the invention will appear on the description to follow of the representative embodiments disclosed in the accompanying drawings.

DESCRIPTION OF THE DRAWINGS

FIG. 2 is an end view of the device shown in FIG. 1 including a schematic illustration of rack structure with which the device is used;

FIG. 5 is a schematic illustration of possible variations in relative position between a mechanical storage device and a rack structure.

DESCRIPTION OF THE PREFERRED EMBODIMENT

Figure 1:
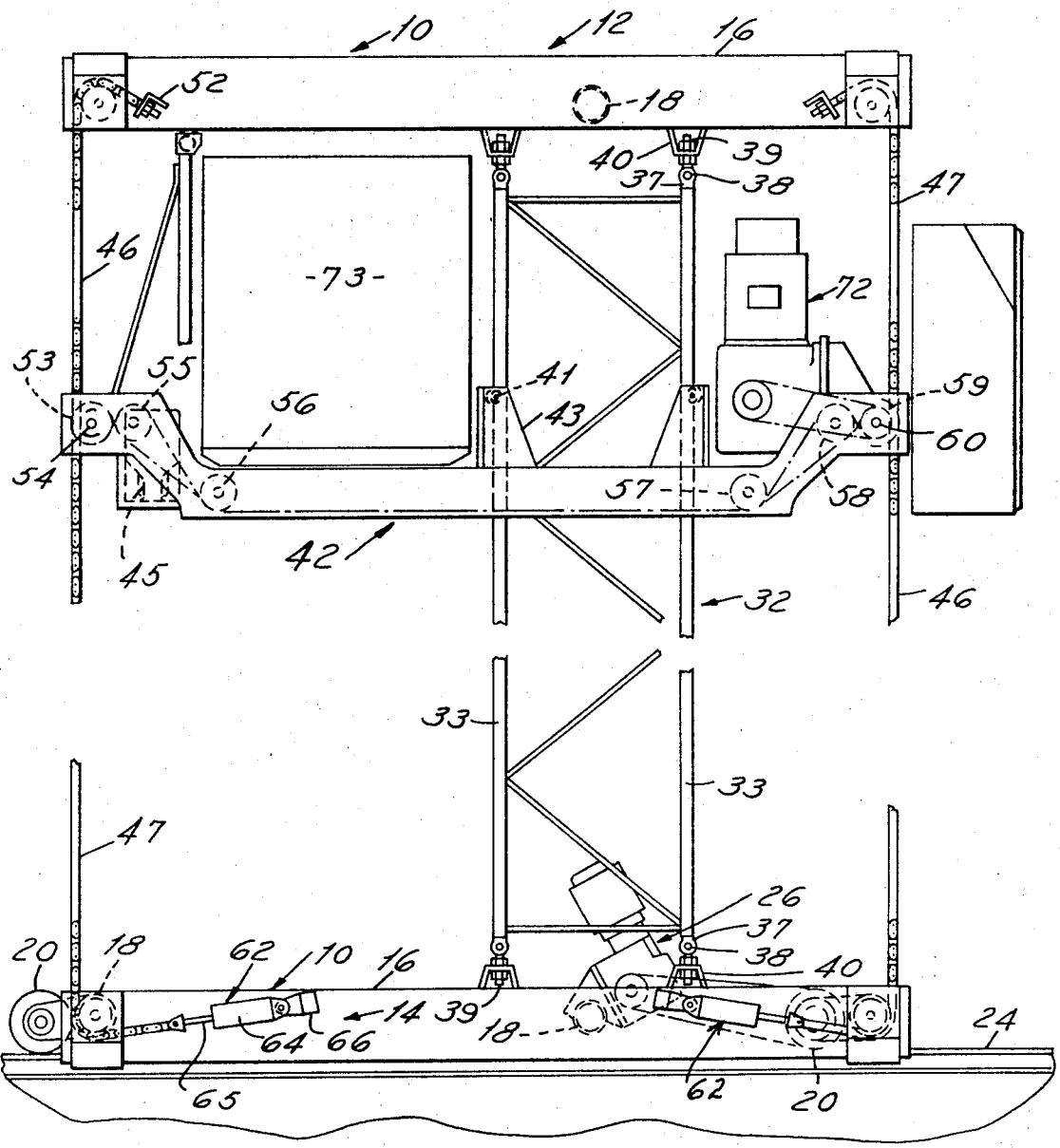
FIG. 1 is a side elevation of a mechanical storage device constructed in accordance with the invention.

The mechanical storage device construction shown in FIGS. 1 and 2 has a base 10 formed by an upper frame 12 and a lower frame 14. Each of these frames 12 and 14 includes suitably interconnected longitudinal members 16 and 17 and transverse members 18. Supporting wheels 20 and guide rollers 22 are carried by transverse members 18 of the lower frame 14 and are capable of supporting and guiding the device for travel along a floor supported rail 24. Motive power is supplied to at least one of the supporting wheels 20 by a drive unit 26 mounted on the lower frame 14. Guide rollers 28, mounted on transverse members 18 of the upper frame 12, are engageable with an upper rail 30 which is secured to suitably supported horizontal beams 31.

Mast structure 32 is connected between the frames and spaces them apart. In the construction shown, the mast structure 32 is formed by a conventional box-truss section, as commonly employed for boom-type cranes, having four vertical members 33 connected together by horizontal and diagonal braces.

Alternate forms of connection of the mast to the frames are shown in FIGS. 1 and 2. In FIG. 2, plates 34 fixed to the ends of the vertical members 33 are rigidly secured to mounting pads 35 on the frames by bolts 36, and shims may of course be employed between the surfaces of the plates 34 and pads 35 for limited adjustment of the attitude of the mast. In FIG. 1, the vertical members 33 of the mast each have a clevis form of upper and lower end fitting 37, connected by a pivot 38 to an eye-bolt 39. Each eye-bolt 39 is secured by nuts to a bracket 40 fastened to a longitudinal member 16 or 17 of an upper or lower frame 12 or 14, and provides an adjustable connection at each of the points of attachment between the mast and the frames 12 and 14. By adjusting the nuts, the effective length of each eye-bolt 39 can be varied to impart a limited amount of tilt to the vertical attitude of the mast structure 32. This tilt can take place about the pivots 38 connecting the mast to the eye-bolts 39 and tilting the mast in the plane of the drawing, FIG. 1; also, a difference in effective length in a pair of eye-bolts on one side of the upper and lower rails 30 and 24 relative to the length of a pair eye-bolts on the other side of these rails will result in a limited tilting of the vertical attitude of the mast 32 in the plane of the drawing, FIG. 2, at least to the extent permitted by any clearance between the guide rollers 28 on the upper frame 12 and the upper rail 30, and any play in the pivots 38 connecting the mast to the eye bolts.

An article handling carriage 42 is movable, in a manner to be hereafter described, in a path defined by guide means on the carriage and on the mast structure. These guide means comprise diagonally placed guide rollers 41 carried by brackets 43 on the carriage and engageable with the vertical members 33 of the mast structure. The carriage 42 is equipped with a conventional load handling table 44 (FIG. 2), which is laterally extendable and retractable by operation of a drive unit 45 (FIG. 1).

A desired horizontal attitude of the carriage 42 is established and maintained independently of the vertical attitude of the mast structure 32, by a device that will be referred to for convenience as "parallelogramming means". In the construction shown, four flexible members, preferably chains 46, 47, 48 and 49 are each secured to the upper and lower frames 12 and 14 and engage horizontally spaced sprockets rotatably mounted on the carriage 42. The manner in which these chains are arranged is perhaps best shown in FIG. 1. The chain 46 is secured to a lug 52 on the upper frame 12 and extends downwardly into engagement with a sprocket 53 keyed to a rotatable shaft 54 on the carriage. From the sprocket 53, the chain 46 is trained over an idler sprocket 55, under horizontally spaced idler sprockets 56 and 57, under an idler sprocket 58, and over a sprocket 59 keyed to a transverse shaft 60. The chain 46 then extends downwardly and is secured to a chain control unit 62 on the lower frame 14. Each of the remaining chains 47, 48 and 49 is mounted in a similar manner, it being understood that each of these chains engages its own set of sprockets on the carriage corresponding to the sprockets 53–59 described above.

Figure 4:
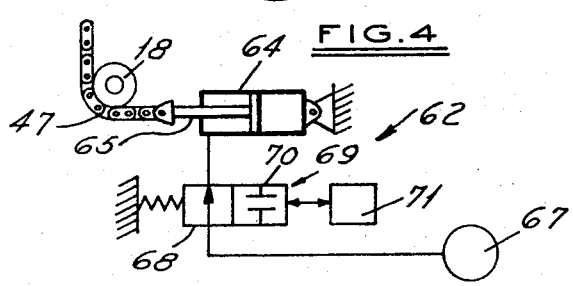
FIG. 4 is a schematic view illustrating a connection for tensioning and controlling the length of the chains which position the carriage.

Each control unit 62, as best shown in FIGS. 1 and 4 includes a hydraulic cylinder 64 having a piston and rod 65. The cylinder is pivoted to a suitable bracket 66 on the lower frame 14 and the rod is connected to the lower end of one of the chains 46–49. Hydraulic pressure is supplied from an accumulator 67 to the cylinder 64 through a normally open passage 68 of a valve 69, retracting the piston and rod 65 within the cylinder 64 and applying tension to the chain proportional to the charge on the accumulator 67. The valve 69 has a closed port 70, and may be shifted by suitable means such as a solenoid 71 to a closed position in which the flow of fluid between the cylinder 64 and the accumulator 67 is blocked.

In the normally open position of the valve 69 the cylinder 64 and rod 65 act as a variable length tensioning device; and, in the closed position of the valve, as a fixed maximum length connection of a chain to the lower frame.

This form of parallelogramming means may essentially be considered as including at least a pair of chains, such as the chains 46 and 49, mounted in parallel vertical planes, these chains engaging sprockets secured to each of the pair of horizontally spaced shafts 54 and 60 mounted on the carriage, with each chain extending generally vertically from an attachment point such as the lug 52 on the upper frame 12, horizontally between the sprockets on the shafts 54 and 60 and then vertically to an attachment such as the unit 62 on the lower frame 14. Preferably an adjustable connection is used at the ends of each chain.

By adjusting the chains 46–49 and their engagement with the sprockets on the shafts 54 and 60, established, desired horizontal attitude of the carriage will be established and this attitude will be maintained independently of the vertical attitude of the mast structure, at least within the relatively small degree of change in the vertical attitude of the mast structure required in order to accomplish the purposes of this invention.

An advantage obtainable from the use of chains as the parallelogramming means lies in the fact that the hoist for raising and lowering the carriage in the path of movement defined by the guide means on the carriage and the mast structure may consist of a power unit 72 mounted on the carriage and arranged to drive one of the shafts on which the sprockets are mounted, such as the shaft 60 as shown in FIG. 1.

Another advantage of the construction is that the carriage 42 may be asymmetric relative to the mast structure 32, as shown, or in other words, the dimensions of the portion of the carriage on which an article 73 is received is not related to, or limited by the area required to mount the carriage on the mast structure 32.

The control units 62, in the normally open position of the valve 69, compensate for stretch in the chains 46–49 which is greatest when the carriage 42 is in the lowermost position. As the carriage is raised, that portion of each chain below the carriage becomes unloaded and can return to the original length determined by the tension applied by the control unit 62. Operation of the solenoids 71 which shift the valves 69 of the control units is coordinated with the operation of the drive unit 45 for the load handling table 44. Before the table 44 is extended in either direction, the solenoids 71 of the control units 62 are energized to shift the valves 69 to closed position and convert the units from variable to fixed length connectors. When the table 44 is extended outwardly to one side of the device as shown in FIG. 2, increased tension is applied to the portions of the chains 46 and 47 below the carriage 42 on the other side, and if the units 62 connecting these chains to the base were operating as constant tension, variable length connectors, the effective length of these chains would increase, permitting the outboard end of the table 44 to tilt downwardly.

Figure 3:
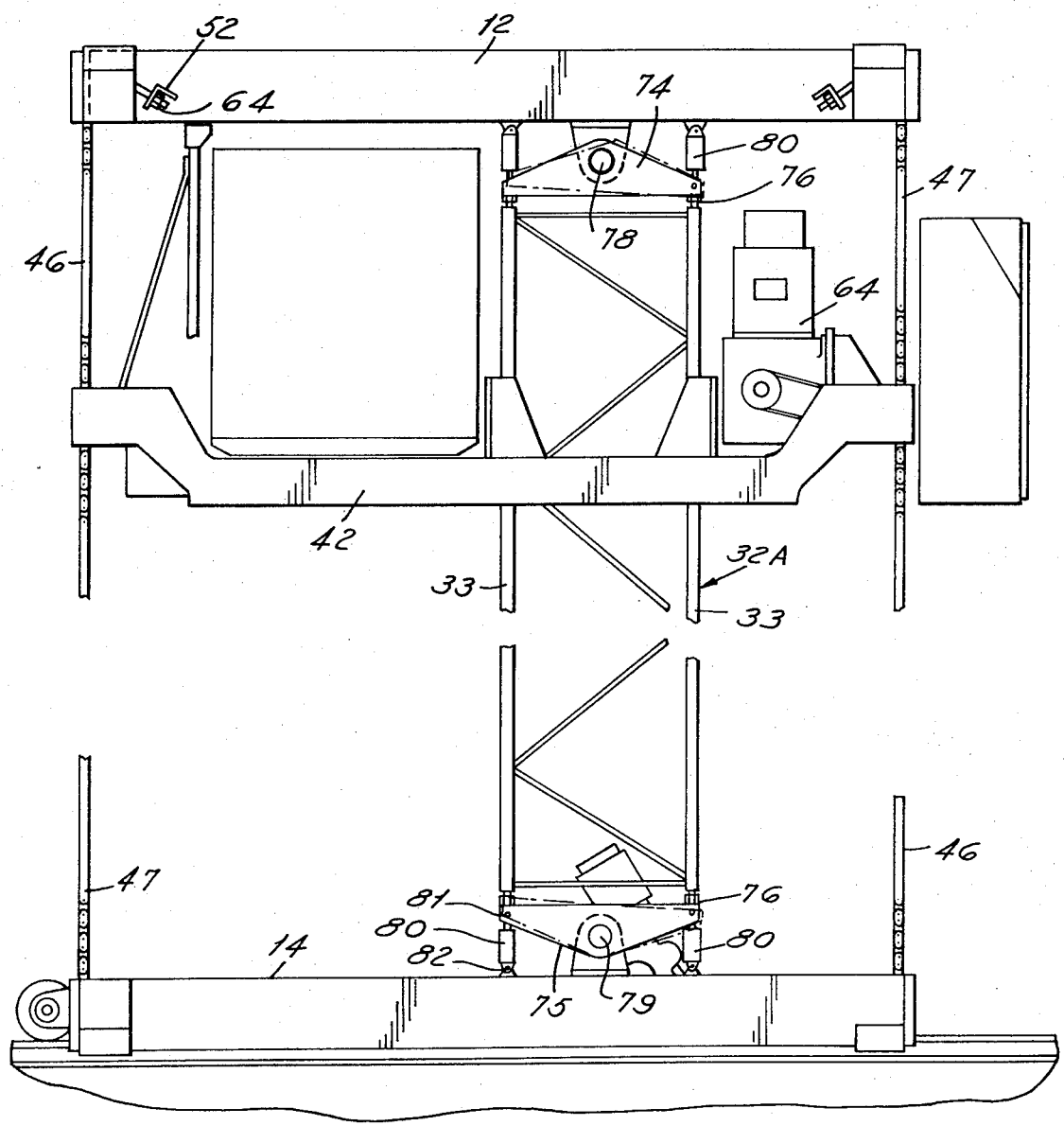
FIG. 3 is a side elevation similar to FIG. 1 showing a modified form of adjustable connection between the mast structure and base frame of the device.

FIG. 3 illustrates a modification in the connecting means for attaching the mast structure to the base. The vertical members 33 of the mast structure 32A are secured to upper and lower pairs of beams 74 and 75, preferably with adjustable connections 76 to facilitate the proper alignment of the mast structure during the initial installation of the stacker crane. Each pair of beams 74 and 75 is mounted on a pivot 78 or 79 carried by the upper and lower frames 12 and 14, respectively. At least one, but preferably a plurality of variable length connecting members in the form of fluid pressure cylinders 80 are secured between each of the upper and lower frames 12 and 14 and each of the upper and lower pairs of beams 74 and 75 adjacent the corners of the mast structure. Each cylinder 80 is connected to a beam by a pivot 81 and to a frame by a pivot 82. It can be seen that the relative length of the fluid pressure cylinders 80 on either side of the pivots 78 and 79 will determine the relative positions of the mast structure and the upper and lower frames 12 and 14 with reference to the axes of the pivots 78 and 79.

The advantages of such an arrangement are illustrated by FIG. 5 in which the mechanical storage device has an upper frame 12A supported for travel on an overhead rail 84, and a lower frame 14A traveling in a path defined by a guide rail 85, although the reverse mounting shown in FIGS. 1–3 could obviously be alternately employed. Mast structure 32B is connected to each of the upper and lower frames on upper and lower pivotal axes 86 and 87 which extend transversely to the path of movement of the device along the rails 84 and 85, and a vertically moveable carriage 42 is mounted for travel in a path defined by guide means between this carriage and the mast structure 32B, with parallelo-gramming means in the form of chains 88 connected to the base frames and to the carriage for establishing a desired horizontal attitude of the carriage independently of the vertical attitude of the mast structure, as previously described.

The path of movement of the device is adjacent to rack structure 90 of an article handling and storage facility, the rack structure providing vertical rows of article storage spaces 91, 92, etc..

This rack structure 90 is subject to change in the position of a storage space, such as the space 91H at the top of the vertical row 91, relative to the storage space at the bottom of such row. Such a change in position can result from the temperature gradient between the lower and upper portions of the rack structure, or from unequal loading of the rack structure, or from a combination of these factors. Due to the fact that the rack structure is conventionally longer in a direction parallel to the path of travel of the stacker crane than in a direction normal to such path of travel, most of this change in position will occur in either of the directions indicated by the double arrow 94 in FIG. 5, although some change in position may be in either of the directions indicated by the double arrow 95. The amount of change in position will of course depend upon the characteristics of a particular installation and the conditions encountered in service, but it is common practice to anticipate a change in position on the order of 3 inches in either of the directions 94.

For an article handling and storage facility in which the mechanical storage device is automatically controlled so that it can be dispatched to a particular vertical row of storage spaces and deposit or retrieve an article from a selected space in such row, the change in position discussed above ordinarily means that the dimension of each storage space in the directions 94 must be correspondingly increased so that the article handling table of the device can service any storage space in the row without interference between the article being handled, or the table, and the vertical members of the rack structure. If abnormal conditions cause a shifting of the rack structure in excess of the amount allowed, then the stacker crane cannot be properly controlled automatically.

The stacker crane shown in FIG. 5 incorporates adjustable length connecting members 98 secured between the upper and lower frames 12A and 14A and the mast structure 32B, enabling the vertical attitude of the mast structure to be adjusted independently of the horizontal attitude of the carriage, and thereby enabling the vertical attitude of the guide means which define the path of movement of the carriage 42 to be aligned with the rack structure in a vertical plane extending parallel to the path of stacker crane movement.

I claim:

1. A mechanical storage device having a base movable along a substantially horizontal support, the base comprising an upper frame and a lower frame at least one of which includes means capable of supporting and guiding the storage device;

mast structure;

connecting means for attaching the mast structure to the base with the mast structure extending generally vertically;

a generally horizontal article handling carriage mounted on the mast structure;

guide means on the carriage and the mast structure for defining a path of movement of the carriage longitudinally of the mast structure, the guide means permitting a change between the relative vertical and horizontal attitudes of the mast structure and the carriage;

parallelogramming means connected to the base and to the carriage for establishing a desired horizontal attitude of the carriage independently of the vertical attitude of the mast structure and the guide means thereon, the parallelogramming means including at least a pair of chains mounted in parallel vertical planes, each chain being secured to the upper and lower frames and having a portion extending across the carriage and engaging generally horizontally spaced sprockets rotatably mounted thereon, a sprocket engaged by one of the chains being connected by a shaft to a sprocket engaged by the other of the chains;

and hoist means comprising a drive unit mounted on the carriage and operatively connected to the shaft for raising and lowering the carriage in said path of movement.

2. A mechanical storage device having a base movable along a substantially horizontal support;

mast structure;

connecting means for attaching the mast structure to the base with the mast structure extending generally vertically, the connecting means comprising an adjustable connection between the mast structure and the base permitting a limited vertical tilt of the mast structure and the path of carriage movement defined by the guide means, the adjustable connection including a pivot attaching the mast structure to the base on a horizontal axis and a variable length connecting means secured between the base and the mast structure and determining the relative positions thereof with reference to said axis;

a generally horizontal article handling carriage mounted on the mast structure, guide means on the carriage and the mast structure for defining a path of movement of the carriage longitudinally of the mast structure, the guide means permitting a change between the relative vertical and horizontal attitudes of the mast structure and the carriage, parallelogramming means connected to the base and to the carriage for establishing a desired horizontal attitude of the carriage independently of the vertical attitude of the mast structure and the guide means thereon, and hoist means for raising and lowering the carriage in said path of movement.

3. A mechanical storage device according to claim 2 wherein the base comprises an upper frame and a lower frame, and the adjustable connection includes at least one pivot attaching each frame to the mast structure.

4. A mechanical storage device according to claim 2 wherein the variable length connecting means comprises a fluid pressure cylinder and piston unit.

5. A mechanical storage device having a base movable along a substantially horizontal support, the base comprising an upper frame and a lower frame;

mast structure;

connecting means for attaching the mast structure to the base with the mast structure extending generally vertically;

a generally horizontal article handling carriage mounted on the mast structure;

guide means on the carriage and the mast structure for defining a path of movement of the carriage longitudinally of the mast structure, the guide means permitting a change between the relative vertical and horizontal attitudes of the mast structure and the carriage;

parallelogramming means connected to the base and to the carriage for establishing a desired horizontal attitude of the carriage independently of the vertical attitude of the mast structure and the guide means thereon, the parallelogramming means including at least a pair of chains mounted in parallel vertical planes, a pair of horizontally spaced shafts rotatably mounted on the carriage and extending between the vertical planes, sprockets secured to each of the shafts in each of the vertical planes providing a pair of horizontally displaced sprockets in each plane, each chain extending generally vertically from an attachment on the upper frame, horizontally, between a pair of sprockets and vertically to a connector on the lower frame;

and hoist means for raising and lowering the carriage in said path of movement, the hoist means comprising a drive unit mounted on the carriage and operable to rotate one of said shafts and cause the carriage to move along the chains of the parallelogramming means.

6. A mechanical storage device according to claim 5 wherein the connector on the lower frame comprises variable length means for applying tension to the chain and means for selectively preventing an increase in length of the variable length means under increasing chain tension.

7. A mechanical storage device according to claim 6 wherein the connecting means for attaching the mast structure to the base comprises an adjustable connection permitting a desired vertical tilt of the mast structure and the path of carriage movement defined by the guide means.

8. A mechanical storage device according to claim 7 wherein the adjustable connection comprises pivot means attaching the mast structure to the base and variable length connecting means secured to the base and to the mast structure for tilting the mast structure.

9. A mechanical storage device according to claim 8 wherein the variable length connecting means comprises a fluid pressure cylinder and piston unit.

10. A mechanical storage device according to claim 5 wherein the connecting means for attaching the mast structure to the base comprises an adjustable connection permitting a desired vertical tilt of the mast structure and the path of carriage movement defined by the guide means.

* * * * *